(12) United States Patent
Chien et al.

(10) Patent No.: US 9,471,498 B2
(45) Date of Patent: Oct. 18, 2016

(54) MEMORY CARD ACCESS DEVICE, CONTROL METHOD THEREOF, AND MEMORY CARD ACCESS SYSTEM

(71) Applicant: REALTEK SEMICONDUCTOR CORPORATION, Hsinchu (TW)

(72) Inventors: Chih-Ching Chien, Hsinchu County (TW); Ho-Lin Wang, Hsinchu (TW)

(73) Assignee: REALTEK SEMICONDUCTOR CORPORATION, Hsinchu (TW)

(*) Notice: Subject to any disclaimer, the term of this patent is extended or adjusted under 35 U.S.C. 154(b) by 203 days.

(21) Appl. No.: 14/269,956

(22) Filed: May 5, 2014

(65) Prior Publication Data
US 2015/0081951 A1   Mar. 19, 2015

(30) Foreign Application Priority Data

Sep. 18, 2013  (TW) .............. 102134008 A

(51) Int. Cl.
*G06F 12/08*  (2016.01)
*G06F 3/06*  (2006.01)

(52) U.S. Cl.
CPC ............. *G06F 12/0866* (2013.01); *G06F 3/06* (2013.01); *G06F 2212/2022* (2013.01); *G06F 2212/2146* (2013.01)

(58) Field of Classification Search
CPC .................................................. G06F 12/0866
See application file for complete search history.

(56) References Cited

U.S. PATENT DOCUMENTS

| 8,037,236 B2* | 10/2011 | Yeh ............... G06F 12/0246 365/185.01 |
| 8,180,931 B2* | 5/2012 | Lee ............... G06F 3/0613 710/14 |
| 2008/0005462 A1* | 1/2008 | Pyeon ............... G06F 3/061 711/113 |

FOREIGN PATENT DOCUMENTS

| JP | 02-76044 | 3/1990 |
| JP | 2003-99386 | 4/2003 |
| JP | 2004-192739 | 7/2004 |
| JP | 2005-78161 | 3/2005 |
| JP | 2006-85491 | 3/2006 |
| JP | 2010-157917 | 7/2010 |

(Continued)

OTHER PUBLICATIONS

Office Action for counterpart JP application No. 2014-095720 issued Aug. 24, 2015.

(Continued)

*Primary Examiner* — Edward Dudek, Jr.
(74) *Attorney, Agent, or Firm* — WPAT, P.C., Intellectual Property Attorneys; Anthony King

(57) ABSTRACT

The present invention discloses a memory card access device, the control method thereof and a memory card access system. Said device comprises: a memory card interface circuit to generate card-read data according to a card-read signal or generate a card-writing signal according to card-writing data; a host interface circuit to generate host-read data according to a host-read signal or generate the host-writing signal according to host-writing data; and a control circuit, coupled to the memory card and host interface circuits respectively, operable to generate the host-writing data by processing the card-read data according to a predetermined cache protocol or generating the card-writing data by processing the host-read data according to the predetermined cache protocol, so as to treat a memory card as a cache device.

20 Claims, 4 Drawing Sheets

(56) References Cited

FOREIGN PATENT DOCUMENTS

| JP | 2012-53572 | 3/2012 |
|---|---|---|
| TW | 200813817 | 3/2008 |
| TW | 201035978 | 10/2010 |
| TW | 201145037 | 12/2011 |

OTHER PUBLICATIONS

English abstract translation of the Office Action for counterpart JP application No. 2014-095720 issued Aug. 24, 2015.
English translation of JP 2012-53572.
English translation of JP 2010-157917.
English translation of JP 2004-192739.
English translation of JP 2006-85491.
English translation of JP 2003-99386.
English translation of JP 2005-78161.
English translation of JP 02-76044.
Office Action and Search Report mailed Apr. 28, 2015 for the counterpart TW application 102134008.
English abstract translation of Office Action mailed Apr. 28, 2015 for the counterpart TW application 102134008.
US publication 20080005462 corresponds to TW publication TW200813817.
U.S. Pat. No. 8,180,931 corresponds to TW publication TW201145037.
U.S. Pat. No. 8,037,236 corresponds to TW publication TW201035978.

* cited by examiner

MEMORY CARD ACCESS DEVICE, CONTROL METHOD THEREOF, AND MEMORY CARD ACCESS SYSTEM

BACKGROUND OF THE INVENTION

1. Field of the Invention

The present invention relates to a data access device, the control method thereof and a data access system, especially to a memory card access device, the control method thereof and a memory card access system.

2. Description of Related Art

A general electronic device often reads data from a storage device for system start-up or operation during a reboot process (a.k.a. hot start-up), a boot process (a.k.a. cold start-up) or a normal operation. There is a great chance that the data in demand are stored in discrete addresses of the storage device; therefore, the speed of start-up or data reading operation of the electronic device will be highly dependent on the random data access rate at which the storage device is able to function.

Generally, a common storage device could be a traditional hard disk drive (HDD) working with a mechanical spindle or a solid state disk (SSD) using flash memory as the storage medium. The traditional HDD has the advantages of large storage volume and low cost, but has a worse performance in reading random data, so that it needs long time to complete a start-up procedure or reading random data. In comparison with HDD, SSD has the advantages of small size, low power consumption and high data access rate, but the cost thereof per unit storage volume is relatively high, so that it is hard for SSD to be widely dispersed. In view of the above pros and cons, in order to accelerate the start-up procedure or the rate in reading random data in a cost-effective way, some uses a traditional HDD of large volume as a main storage device and uses a SSD of small volume as a cache device at the same time. This solution often adopts the Native Command Queuing (NCQ) function of the known Advance Host Controller Interface (AHCI) protocol to accelerate the access rate; however, most devices supporting the AHCI protocol are Serial Advanced Technology Attachment (SATA) devices, which means that this solution is limited to accessing data through a SATA interface while the problem of high cost due to using a SSD still exists. There is another solution to support data cache through a HDD with a built-in flash memory; however, this kind of Hybrid HDD costs much more than a traditional HDD of the same storage volume, and thus remains unpopular to electronic device manufacturers who usually take the cost as the first concern.

SUMMARY OF THE INVENTION

In consideration of the imperfections of the prior art, an object of the present invention is to provide a memory card access device, the control method thereof and a memory card access system to make improvements over the prior art.

Another object of the present invention is to provide a memory card access device, the control method thereof and a memory card access system operable to support a predetermined cache protocol for data reading acceleration.

A further object of the present invention is to provide a memory card access device, the control method thereof and a memory card access system operable to support an access operation in compliance with a predetermined cache protocol and a bridging operation independent of the predetermined cache protocol.

The present invention discloses a memory card access device. An embodiment of said device comprises: a memory card interface circuit to receive a card-read signal from a memory card or output a card-writing signal to the memory card, including a card signal processing unit operable to generate card-read data according to the card-read signal or generate the card-writing signal according to card-writing data; a host interface circuit to receive a host-read signal from a host or output a host-writing signal to the host, including a host signal processing unit operable to generate host-read data according to the host-read signal or generate the host-writing signal according to host-writing data; and a control circuit, coupled to the card and host signal processing units, operable to execute at least a protocol operation to generate the host-writing data by processing the card-read data according to a predetermined cache protocol or generating the card-writing data by processing the host-read data according to the predetermined cache protocol, so as to treat the memory card as a cache device of the host.

The present invention also discloses a control method for a memory card access device. An embodiment of said method comprises: receiving a card-read signal from a memory card or outputting a card-writing signal to the memory card; generating card-read data according to the card-read signal or generating the card-writing signal according to card-writing data; receiving a host-read signal from a host or outputting a host-writing signal to the host; generating host-read data according to the host-read signal or generating the host-writing signal according to host-writing data; and executing a protocol operation to generate the host-writing data by processing the card-read data in accordance with a predetermined cache protocol, or generate the card-writing data by processing the host-read data in accordance with the predetermined cache protocol, so as to treat the memory card as a cache device of the host.

The present invention further discloses a memory card access system operable to treat a memory card as a cache device. An embodiment of said system comprises: a central processing unit operable to process frequently used data and non-frequently used data in which the access probability of the frequently used data is more than the access probability of the non-frequently used data; a system bus operable to transmit the frequently and non-frequently used data to the central processing unit; a hard disk interface operable to transmit the non-frequently used data to the system bus; a hard disk operable to provide the non-frequently used data for the hard disk interface; a multi-device supporting interface operable to support a plurality of storage devices and output the frequently used data to the system bus; and a memory card access device operable to provide the frequently used data for the multi-device supporting interface. Said memory card access device includes: a memory card interface circuit to receive a card-read signal from a memory card and generate card-read data according to the card-read signal; a host interface circuit to generate the frequently used data according to host-writing data and output the frequently used data to the multi-device supporting interface; and a control circuit, coupled to the memory card interface circuit and the host interface circuit, operable to execute at least the following operation: a protocol operation to generate the host-writing data by processing the card-read data according to a predetermined cache protocol.

These and other objectives of the present invention will no doubt become obvious to those of ordinary skill in the art after reading the following detailed description of the preferred embodiments that are illustrated in the various figures and drawings.

BRIEF DESCRIPTION OF THE DRAWINGS

FIG. 2b illustrates an embodiment of the control circuit of FIG. 2a.

FIG. 2c illustrates another embodiment of the control circuit of FIG. 2a.

DETAILED DESCRIPTION OF THE PREFERRED EMBODIMENTS

The following description is written by referring to terms of this invention field. If any term is defined in the specification, such term should be explained accordingly. Besides, the connection between objects or events in the following embodiments can be direct or indirect provided that these embodiments are still applicable under such connection. Said "indirect" means that an intermediate object or a physical space is existed between the objects, or an intermediate event or a time interval is existed between the events. In addition, the following description relates to data access under a predetermined protocol, and the detail thereof known in this field will be omitted if such detail has little to do with the features of the present invention. Furthermore, the shape, size, and ratio of any element and the step sequence of any flow chart in the disclosed figures are just exemplary for understanding, not for limiting the scope of this invention.

The disclosure of the present invention includes a memory card access system, a memory card access device and the control method thereof operable to treat a memory card as a cache device. Said system could be a stationary electronic device (e.g. a desktop computer or an embedded-type of host) or a portable electronic device (e.g. a notebook computer, a tablet PC, a personal digital assistant (PDA) or a smart phone); said memory card access device could be a device applicable to said system or its equivalent; and said control method could be a method to manipulate said device or its equivalent. Provided that an implementation derived from the present invention is applicable, people of ordinary skill in the art can choose components or steps equivalent to those described in this specification to carry out said implementation, which means that the scope of this invention is not limited to the embodiments in the specification. On account of that some elements of said device invention could be known, the detail of such elements will be omitted provided that the specification and enablement requirements are still fulfilled. Besides, said method invention can be in the form of firmware and/or software which could be carried out by the device of this invention or the equivalent thereof; hence, the following description on the method invention will abridge the hardware details or well-known parts provided that the remaining disclosure is still enough for understanding and enablement.

Figure 1:
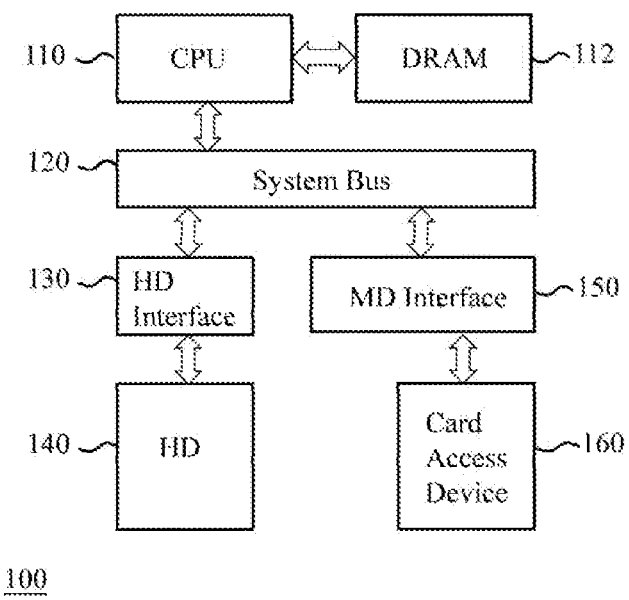
FIG. 1 illustrates an embodiment of the memory card access system of the present invention.

Please refer to FIG. 1 which illustrates an embodiment of the memory card access system of the present invention. Said memory card access system 100 comprises: a central processing unit 110 (CPU), a system bus 120, a hard disk interface 130 (HD Interface), a hard disk 140 (HD), a multi-device supporting interface 150 (MD Interface), and a memory card access device 160 (Card Access Device). The central processing unit 110 is electrically connected with a dynamic random access memory 112 (DRAM) and operable to function according to an operating system, and capable of reading and processing frequently used data (a.k.a. hot data) and non-frequently used data (a.k.a. cold data) in which the access probability of the frequently used data is more than the access probability of the non-frequently used data while the two kinds of data could be defined by the above-mentioned operating system and/or the software loaded therein and/or some related hardware parameters. The system bus 120 is electrically connected with the central processing unit 110 and operable to transmit the frequently and non-frequently used data to the central processing unit 110; in practice the system bus 120 may connect to the central processing unit 110 directly or through one or more input/output circuits (e.g. a north-bridge circuit and a south-bridge circuit, or a platform controller hub (PCH) circuit); since these direct or indirect connection techniques are known in this field, the detail thereof will be omitted here without interfering with the enablement of the present invention. Turn to the hard disk interface 130; it is electrically connected with the system bus 120 and operable to output hard disk data of the hard disk 140 to the system bus. In this embodiment, the hard disk interface 130 is a SATA interface; however, other kinds of hard disk interfaces (e.g. IDE interface, e-SATA interface, PCI-Express interface, and etc.) could be adopted instead provided that the present invention is still workable according to the disclosure or teaching in this specification. The hard disk 140 is connected with the hard disk interface 130 and operable to provide said hard disk data for the hard disk interface 130. Said hard disk data may include the aforementioned frequently and non-frequently used data; however, in view of the slower data access rate of the hard disk 140, the hard disk data here is mostly deemed the non-frequently used data to be distinguished from the data of the memory card access device 160. Said hard disk 140 here is a SATA disk drive such as a traditional mechanical hard disk drive or a solid state disk; but in an alternative embodiment of the present invention, the hard disk 140 could be a hard disk supporting another type of hard disk interface as long as it conforms to the type of the foresaid hard disk interface 130. As for the multi-device supporting interface 150, it is electrically connected with the system bus 120 and operable to support a plurality of storage devices and output the frequently used data from one or more of the storage devices to the system bus 120. In this embodiment the multi-device supporting interface 150 is a PCI-Express interface; however other interfaces supporting multiple devices (e.g. USB interface) is also applicable to the present invention if such application is workable. At last the memory card access device 160 is electrically connected with the multi-device supporting interface 150 and operable to access the frequently used data of a memory card. Said frequently used data may be put in the memory card in advance; for instance, the frequently used data related to a start-up procedure could be pre-stored in the memory card to allow a host accessing it in a relatively high speed for the acceleration of start-up. The frequently used data could also be some data copy from the hard disk 140 after the start-up procedure under the control of the operating system and/or the software loaded therein. Furthermore, in the present embodiment the memory card access device 160 is a multi-card access device capable of accessing a lot of known memory cards and/or modules including the SD card; however, in an alternative embodiment, the memory card access device 160 could be a single card access device only in support of one kind of memory card such as the SD card, eMMC module, xD card, MS PRO card, MMC card and etc.

Figure 2A:
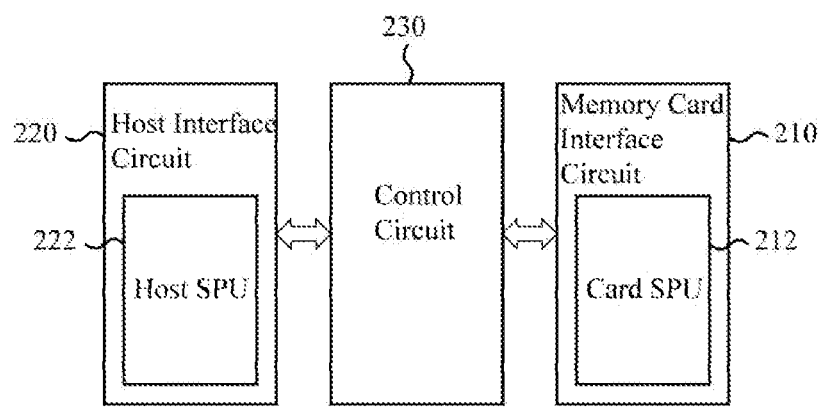
FIG. 2a illustrates an embodiment of the memory card access device of FIG. 1.

FIG. 2a illustrates an embodiment of the above-mentioned memory card access device 160, comprising: a memory card interface circuit 210, a host interface circuit 220, and a control circuit 230. Said memory card interface circuit 210 electrically connects to the aforementioned memory card (e.g. a SD card of UHS-I or UHS-II class) and is operable to receive a card-read signal from the memory card or output a card-writing signal to the memory card, including: a card signal processing unit 212 (Card SPU) operable to generate card-read data according to the card-read signal or generating the card-writing signal according to card-writing data. In this embodiment, the card signal processing unit 212 is a SD card signal processing unit; however, other types of processing units (e.g. eMMC module processing unit, xD card processing unit or MS PRO card processing unit) are also applicable to the present invention provided that such applications are still workable in compliance with the teaching in this specification. Please note that the memory card interface circuit 210 may further comprise additional card signal processing units for handling other types of memory cards in accordance with the above-mentioned manner. Turn to the host interface circuit 220; it electrically connects to the aforementioned multi-device supporting interface 150 and is operable to receive a host-read signal or output a host-writing signal (i.e. the frequently-used data) to the multi-device supporting interface 150, including: a host signal processing unit 222 (Host SPU) operable to generate host-read data according to the host-read signal or generate the host-writing signal according to host-writing data. In this embodiment, the host signal processing unit 222 is a PCI-Express signal processing unit; however, other types of processing units (e.g. USB signal processing unit) are also applicable to the present invention if such applications are workable. As for the control circuit 230 (such as the circuit composed of microprocessor (MCU), random access memory (RAM), read only memory (ROM), registers and some other logic elements), it is coupled with the card signal processing unit 212 and the host signal processing unit 222 and capable of executing one or more operations. The one or more operations include a protocol operation to generate the host-writing data by processing the card-read data according to a predetermined cache protocol, or generate the card-writing data by processing the host-read data in accordance with the predetermined cache protocol, so that the memory card will function like a cache device. In this embodiment the control circuit 230 is realized through those of ordinary skill in the art assembling known components (such as MCU, RAM, ROM and registers) in accordance with the present invention, and the predetermined cache protocol is the AHCI (Advance Host Controller Interface) protocol; however, other protocols such as the NVM-Express (Non-Volatile Memory Express) protocol or a self-defined protocol could be adopted in the present invention. Please note that if a self-defined protocol is adopted, the aforementioned central processing unit 110 or the software/hardware pertaining to it has to be designed with the capability of recognizing the self-defined protocol; please also note that the AHCI and NVM-Express protocols could be used for the acceleration of data access and are well known in this field, so that the details thereof will be omitted to save pages.

Figure 2B:
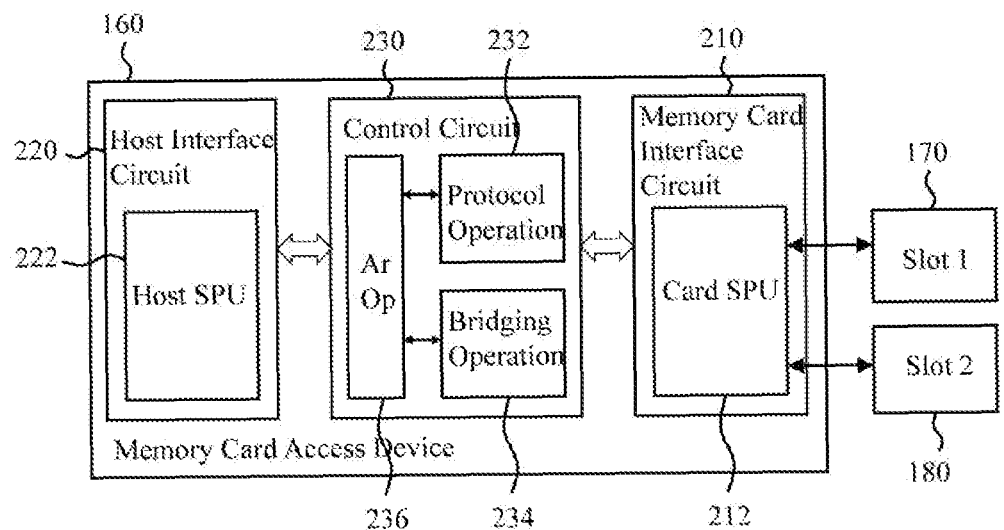
Figure 2C:
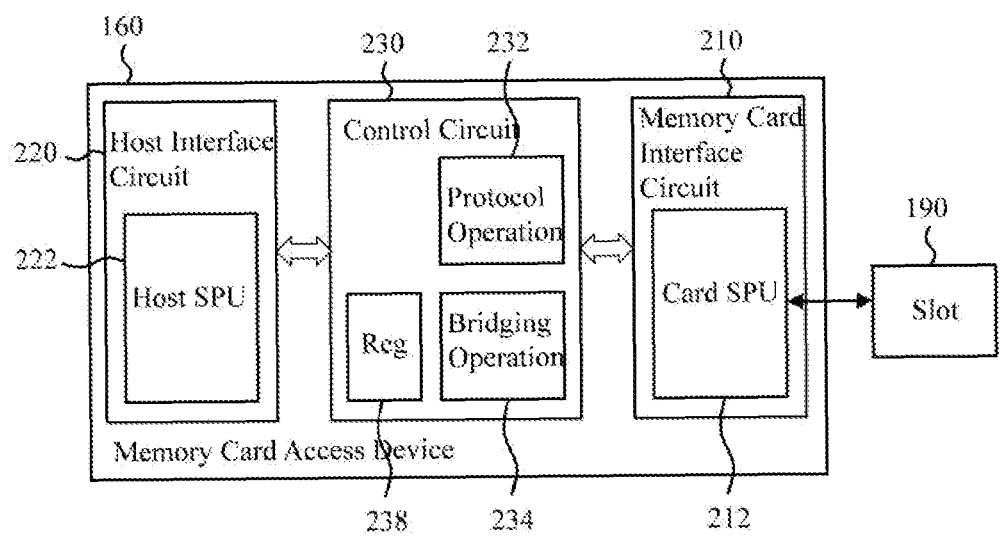

Please refer to FIG. 1 and FIG. 2a. In order to support a normal memory card access operation for accomplishing versatile applications of the present invention, the aforementioned control circuit 230 may not only execute the protocol operation, but also the following operation: a bridging operation to generate another host-writing data (e.g. another non-frequently used data) according to another card-read data, or generate another card-writing data according to another host-read data, wherein the bridging operation is independent of the predetermined cache protocol while the another card-reading and writing data are associated with the foresaid cache memory card or another memory card. For instance, as shown in FIG. 2b, the memory card interface circuit 210 is able to access the cache memory card through a first card accessing mechanism 170 such as a first card slot (Slot 1) and said another memory card through a second card accessing mechanism 180 such as a second card slot (Slot 2) respectively; under the above circumstance, said another card-reading and writing data are associated with the another memory card, and the control circuit 230 is able to execute the protocol operation 232 and bridging operation 234 concurrently. In this case, the two operations 232, 234 may compete with each other for earning the access right to the host interface circuit 220, and thus the control circuit 230 is operable to further execute the following operation: an arbitration operation 236 (Ar Op) to arrange the input or output sequence of any combination of the host-writing data, host-read data, card-read data, card-writing data, another host-writing data, another host-read data, another card-writing data and another card-read data. In a preferred embodiment the arbitration operation 236 may set the access priority of the protocol operation 232 higher than that of the bridging operation 234. Regarding another instance with only one card accessing mechanism available, as shown in FIG. 2c, the memory card interface circuit 210 is able to access said cache memory card and said normal storage memory card through the same card accessing mechanism 190 (Slot) at different times, which means that both the two memory cards can be inserted into the card accessing mechanism 190, but shouldn't be inserted at the same time due to only one card accessing mechanism 190 available. In this case, the types of the two memory cards should be the same, or the electrical connection mechanisms thereof should be matching (e.g. both the two cards are SD cards or SD and MMC cards respectively); besides, the control circuit 230 here is able to carry out one of the protocol operation 232 and the bridging operation 234 based on a host setting value from a register 238 (Reg) of the control circuit 230 in which the host setting value is determined by the host, that is to say the operating system of the memory card access system 100 and/or the software loaded therein and/or some related hardware parameters. Please note that the aforementioned protocol operation 232, the bridging operation 234 and the arbitration operation 236 in FIG. 2b and FIG. 2c can be realized through an integrated hardware block or several separate hardware blocks, and any of the aforementioned card accessing mechanisms 170, 180, 190 can be installed inside the memory card access system 100 but outside the memory card access device 160.

In light of the above, in order to prevent a user from removing the cache memory card unintentionally, the memory card access system 100 of the present invention may set the first card accessing mechanism 170 of FIG. 2b or the card accessing mechanism 190 of FIG. 2c in an ordinarily invisible space, so as to avoid user's mal-operation. For instance, if the present invention is applied to a portable electronic device (e.g. a laptop computer, a tablet computer or a smart phone), the first card accessing mechanism 170 or the card accessing mechanism 190 could be set inside a battery module accommodation space, and since the accommodation space can be sealed with a battery module itself, a cover or the like, the cache memory card installed in the accessing mechanism 170 or 190 won't be mistaken as some memory card for general storage purpose, so that user's mal-operation won't happen.

Besides, in order to achieve a random data access rate better than that of the traditional mechanical hard disk drive by using a memory card as a cache device, the present invention uses appropriate types of the host interface circuit 220 and the memory card interface circuit 210 and implants the foresaid protocol operation into the control circuit 230 to accelerate the data access of the memory card. For instance, the host interface circuit 220 could be a PCI-Express interface circuit, the memory card interface circuit 210 could be a SD card interface circuit, and the protocol operation could be the AHCI protocol operation; accordingly, if the aforementioned card-read data are composed of several pieces of small data, the control circuit 230 is still able to produce the host-writing data according to the card-read data at an average rate more than 10 Mbyte/s provided that each piece of small data is not more than 4 Kbyte and the storage addresses of these pieces of data are discrete. Furthermore, if each piece of small data is not more than 512 Kbyte, the host-writing data production rate of the control circuit 230 can be higher than 10 Mbyte/s and reach 90 Mbyte/s or more. Please note that as long as a random data access rate superior to that of a mechanical hard disk drive (e.g. the random data access rate of a 7200 rpm hard disk drive normally less than 1.5 Mbyte/s provided that each piece of data is not more than 4 Kbyte) is able to be accomplished, other types of host and memory card interface circuits and other kinds of predetermined cache protocols are applicable to the present invention.

Figure 3:
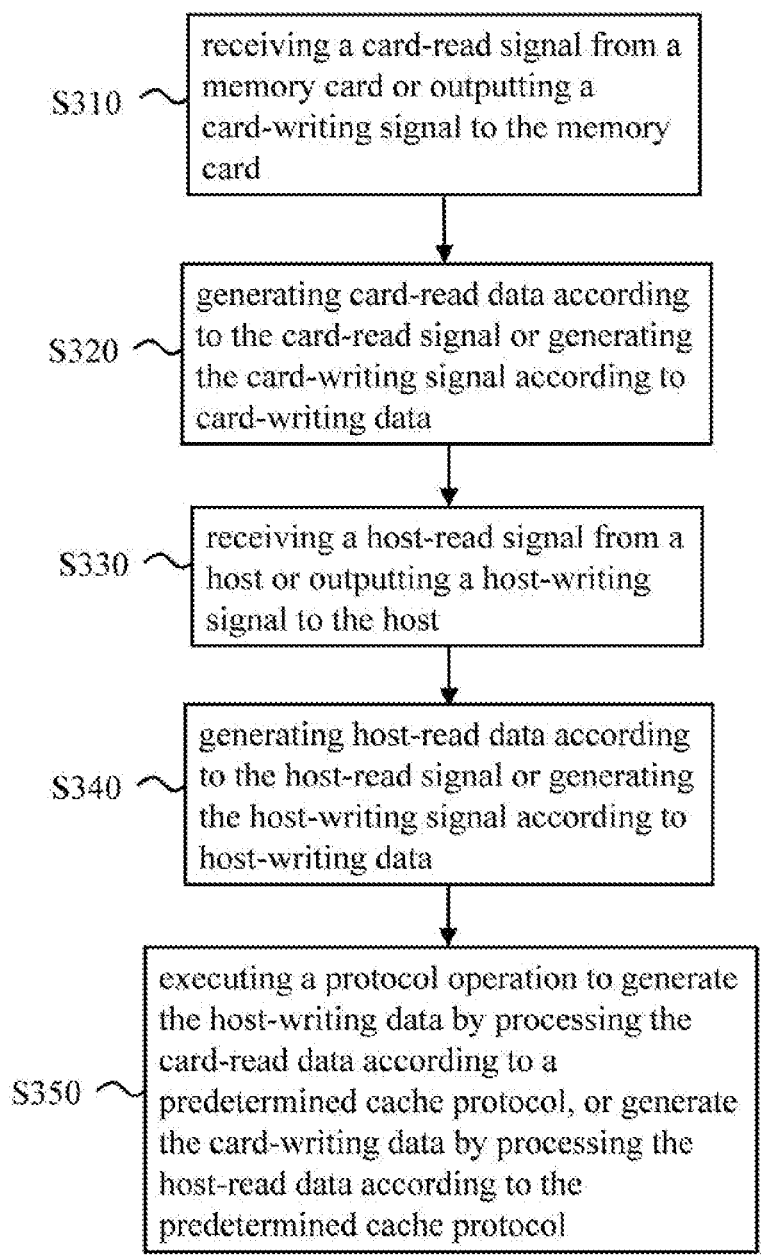
FIG. 3 illustrates an embodiment of the control method for a memory card access device according to the present invention.

In addition to the memory card access system 100 of FIG. 1 and the memory card access device 160 of FIG. 2, the present invention also discloses a memory card access method capable of treating a memory card as a cache device. As shown in FIG. 3, an embodiment of said method comprises the following steps:

step S310: receiving a card-read signal from a memory card or outputting a card-writing signal to the memory card. This step could be carried out by the afore-disclosed memory card interface circuit 210 or its equivalent.

step S320: generating card-read data according to the card-read signal or generating the card-writing signal according to card-writing data. This step could be carried out by the afore-disclosed card signal processing unit 212 or the equivalent thereof.

step S330: receiving a host-read signal from a host or outputting a host-writing signal to the host; said host could be the device including the central processing unit 110, the system bus 120 and the multi-device supporting interface 150 of FIG. 1. This step could be carried out by the afore-disclosed host interface circuit 220 or its equivalent.

step S340: generating host-read data according to the host-read signal or generating the host-writing signal according to host-writing data. This step could be carried out by the afore-disclosed host signal processing unit 222 or its equivalent.

step S350: executing a protocol operation to generate the host-writing data by processing the card-read data according to a predetermined cache protocol, or generate the card-writing data by processing the host-read data according to the predetermined cache protocol. This step could be carried out by the afore-disclosed control circuit 230 or its equivalent.

Figure 4:
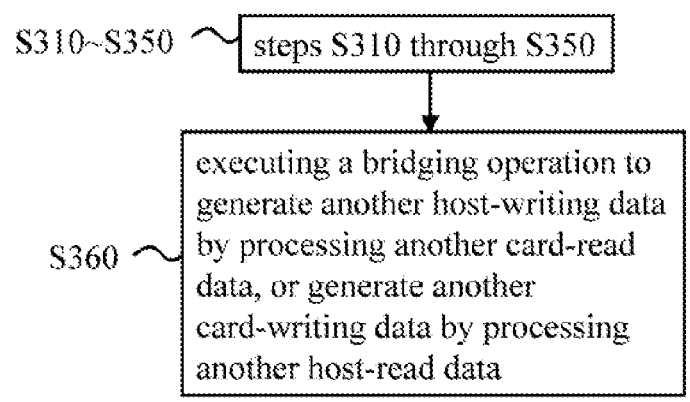
FIG. 4 illustrates another embodiment of the control method for a memory card access device according to the present invention.

Please refer to FIG. 4, in order to make the present invention support a normal memory card access operation in addition to the concerned cache operation, another embodiment of said method invention further comprises the following step:

step S360: executing a bridging operation to generate another host-writing data by processing another card-read data, or generate another card-writing data by processing another host-read data; said bridging operation is independent of the predetermined cache protocol while the another card-reading and writing data are associated with the memory card of step S310 or another memory card. Similarly, this step could be carried out by the control circuit 230 or the equivalent thereof.

In light of the above, step S350 and step S360 could be carried out simultaneously or not. If the two steps are carried out at the same time, said another card-read data and another card-writing data are supposed to pertain to said another memory card instead of the memory card of step S310; meanwhile, in order to prevent the data input/output received or generated by the two steps from collision, the embodiment of FIG. 4 may further include the following step: arranging the input or output sequence of any combination of the host-writing data, host-read data, card-read data, card-writing data, another host-writing data, another host-read data, another card-writing data and another card-read data. The above-mentioned step could be realized by the control circuit 230 performing an arbitration operation. Besides, the foresaid host-read signal and host-writing signal could be PCI-Express signals or USB signals; the predetermined cache protocol could be the AHCI protocol, the NVM-Express protocol or a self-defined protocol; and if the card-read data are composed of a plurality of pieces of data stored in discrete memory addresses, the average generation rate of the host-writing data according to the present invention can be kept higher than 10 Mbyte per second while each piece of data is equal to or less than 4 Kbyte; moreover, if each piece of data is equal to or less than 512 Kbyte, the average generation rate of the host-writing data could climb up to 90 Mbyte/s or more from 10 Mbyte/s.

Since people of ordinary skill in the art can appreciate the implementation detail and the modification thereto of the present method invention through the disclosure about the system invention of FIG. 1 and device invention of FIG. 2, repeated and redundant description are therefore omitted provided that such omission nowhere interferes with the disclosure and enablement requirements. Please note that each embodiment in the following description includes one or more features; however, this doesn't mean that one carrying out the present invention should make use of all the features of one embodiment at the same time, or should only carry out different embodiments separately. In other words, if an implementation derived from one or more of the embodiments is applicable, a person of ordinary skill in the art can selectively make use of some or all of the features in one embodiment or selectively make use of the combination of some or all features in several embodiments to have the implementation come true, so as to increase the flexibility of carrying out the present invention. Besides, the specific values such as the value of data size mentioned in the embodiments of this specification are exemplary; people of ordinary skill in the art can determine the values according to their own demands.

In brief, the memory card access system, device and method of the present invention at least have the following advantages: first, making an inexpensive memory card function as a cache device to achieve performance and cost-effectiveness at the same time; second, accelerating the rate in reading memory card data through the predetermined cache protocol operation (such as the AHCI or NVM-Express protocol operation); third, optionally treating a memory card as a cache device or a normal storage device, or treating two memory cards as a cache device and a storage device respectively, so as to accomplish the versatile applications of the present invention.

The aforementioned descriptions represent merely the preferred embodiments of the present invention, without any intention to limit the scope of the present invention thereto. Various equivalent changes, alterations, or modifications based on the claims of present invention are all consequently viewed as being embraced by the scope of the present invention.

What is claimed is:

1. A memory card access device comprising:
   a memory card interface circuit to receive a card-read signal from a memory card or output a card-writing signal to the memory card, including:
      a card signal processing unit operable to generate card-read data according to the card-read signal or generate the card-writing signal according to card-writing data;
   a host interface circuit to receive a host-read signal from a host or output a host-writing signal to the host, including:
      a host signal processing unit operable to generate host-read data according to the host-read signal or generate the host-writing signal according to host-writing data; and
   a control circuit, coupled to the card and host signal processing units, operable to execute at least the following operation:
      a protocol operation to generate the host-writing data by processing the card-read data according to a predetermined cache protocol or generating the card-writing data by processing the host-read data according to the predetermined cache protocol, so as to treat the memory card as a cache device of the host,
   wherein the predetermined cache protocol is the Advance Host Controller Interface (AHCI) protocol or the Non-Volatile Memory Express (NVM-Express) protocol, and when the card-read data is composed of several pieces of data of small size, the control circuit is operable to generate the host-writing data according to the card-read data at an average rate more than 10 Mbyte per second while the size of each of the several pieces of data is equal to or less than 4 Kbyte.

2. The memory card access device of claim 1, wherein the control circuit is operable to execute the following operation through the memory card interface circuit:
   a bridging operation to generate another host-writing data according to another card-read data or generate another card-writing data according to another host-read data, in which the bridging operation is independent of the predetermined cache protocol while the another card-read data and the another card-writing data are associated with the memory card or another memory card.

3. The memory card access card access device of claim 2, wherein the memory card interface circuit is operable to access the memory card through a first card accessing mechanism and the another memory card through a second card accessing mechanism while the control circuit is operable to carry out the protocol operation and the bridging operation concurrently.

4. The memory card access device of claim 3, wherein the control circuit is operable to execute the following operation:
   an arbitration operation to arrange the input or output sequence of any combination of the host-writing data, host-read data, card-read data, card-writing data, another host-writing data, another host-read data, another card-writing data and another card-read data.

5. The memory card access device of claim 2, wherein the control circuit is operable to carry out one of the protocol and bridging operations in accordance with a host setting value from a register of the control circuit in which the host setting value is determined by the host.

6. The memory card access device of claim 1, wherein the host interface circuit is a PCI-Express interface circuit or a USB interface circuit.

7. The memory card access device of claim 1, wherein the card signal processing unit is a secure digital (SD) card signal processing unit or an embedded multimedia card (eMMC) signal processing unit.

8. The memory access card of claim 1, wherein if the card-read data is composed of data stored in discrete memory addresses, the control circuit is operable to generate the host-writing data according to the card-read data at an average rate more than 10 Mbyte per second.

9. A control method of a memory card access device, comprising:
   receiving a card-read signal from a memory card or outputting a card-writing signal to the memory card;
   generating card-read data according to the card-read signal or generating the card-writing signal according to card-writing data;
   receiving a host-read signal from a host or outputting a host-writing signal to the host;
   generating host-read data according to the host-read signal or generating the host-writing signal according to host-writing data; and
   executing a protocol operation to generate the host-writing data by processing the card-read data in accordance with a predetermined cache protocol, or generate the card-writing data by processing the host-read data in accordance with the predetermined cache protocol, so as to treat the memory card as a cache device of the host,
   wherein the predetermined cache protocol is the Advance Host Controller Interface (AHCI) protocol or the Non-Volatile Memory Express (NVM-Express) protocol, and when the card-read data is composed of several pieces of data of small size, the host-writing data is generated according to the card-read data at an average rate more than 10 Mbyte per second while the size of each of the several pieces of data is equal to or less than 4 Kbyte.

10. The control method of claim 9, further comprising:
   executing a bridging operation to generate another host-writing data according to another card-read data or generate another card-writing data according to another host-read data, wherein the bridging operation is independent of the predetermined cache protocol while the another card-read data and the another card-writing data are associated with the memory card or another memory card.

11. The control method of claim 10, wherein the steps of executing the protocol operation and the bridging operation are operable to be executed concurrently while the another card-read data and the another card-writing data are associated with the another memory card.

12. The control method of claim 11, further comprising:
arranging the input or output sequence of any combination of the host-writing data, host-read data, card-read data, card-writing data, another host-writing data, another host-read data, another card-writing data and another card-read data.

13. The control method of claim 10, wherein the protocol operation and the bridging operation are carried out at different times.

14. The control method of claim 9, wherein the host-read signal and the host-writing signal are PCI-Express signals or USB signals.

15. A memory card access system operable to treat a memory card as a cache device, comprising:
a central processing unit operable to process frequently used data and non-frequently used data in which the access probability of the frequently used data is more than the access probability of the non-frequently used data;
a system bus operable to transmit the frequently and non-frequently used data to the central processing unit;
a hard disk interface operable to transmit the non-frequently used data to the system bus;
a hard disk operable to provide the non-frequently used data for the hard disk interface;
a multi-device supporting interface operable to support a plurality of storage devices and output the frequently used data to the system bus; and
a memory card access device operable to provide the frequently used data for the multi-device supporting interface, including:
a memory card interface circuit to receive a card-read signal from the memory card and generate card-read data according to the card-read signal;
a host interface circuit to generate the frequently used data according to host-writing data and output the frequently used data to the multi-device supporting interface; and
a control circuit, coupled to the memory card interface circuit and the host interface circuit, operable to execute at least the following operation:
a protocol operation to generate the host-writing data by processing the card-read data according to a predetermined cache protocol,
wherein the predetermined cache protocol is the Advance Host Controller Interface (AHCI) protocol or the Non-Volatile Memory Express (NVM-Express) protocol, and when the card-read data is composed of several pieces of data of small size, the host-writing data is generated according to the card-read data at an average rate more than 10 Mbyte per second while the size of each of the several pieces of data is equal to or less than 4 Kbyte.

16. The memory card access system of claim 15, wherein the control circuit is operable to execute the following operation through the memory card interface circuit:
a bridging operation to provide another non-frequently used data for the central processing unit according to another card-read data, wherein the bridging operation is independent of the predetermined cache protocol while the another card-read data is associated with the memory card or another memory card.

17. The memory card access system of claim 16, wherein the another card-read data is associated with the another memory card and the control circuit is operable to carry out the protocol and bridging operations concurrently and execute the following operation:
an arbitration operation to arrange the input or output sequence of any combination of the host-writing data, card-read data, another host-writing data and another card-writing data.

18. The memory card access system of claim 15, wherein the memory card interface circuit is a SD card interface circuit or an eMMC interface circuit.

19. The memory card access system of claim 15, wherein the hard disk interface is a SATA interface while the multi-device supporting interface is a PCI-Express interface or a USB interface.

20. The memory card access system of claim 15, wherein the memory card interface circuit is operable to access the memory card through a card accessing mechanism which is enclosed in an ordinarily invisible space.

* * * * *